(12) United States Patent
Kim et al.

(10) Patent No.: US 9,168,958 B2
(45) Date of Patent: Oct. 27, 2015

(54) AUTOMOTIVE WHEEL SEPARATION MECHANISM

(71) Applicant: Hyundai Motor Company, Seoul (KR)

(72) Inventors: Hyun Sik Kim, Seoul (KR); Sung Uk Hong, Bucheon-si (KR); Joonam Kim, Yongin-si (KR); Soo Heung Eom, Hwaseong-si (KR); Seongsu Shin, Geoje-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/339,288

(22) Filed: Jul. 23, 2014

(65) Prior Publication Data

US 2015/0166115 A1 Jun. 18, 2015

(30) Foreign Application Priority Data

Dec. 18, 2013 (KR) .......................... 10-2013-0158323

(51) Int. Cl.
*B62D 21/15* (2006.01)
*B62D 25/08* (2006.01)
*B60G 7/00* (2006.01)

(52) U.S. Cl.
CPC .............. *B62D 25/082* (2013.01); *B60G 7/001* (2013.01); *B62D 21/155* (2013.01); *B60G 2206/016* (2013.01)

(58) Field of Classification Search
CPC .... B60G 7/001; B60G 7/006; B60G 2200/14; B60G 2206/016; B60G 2206/10; B62D 21/15; B62D 21/155; B62D 25/082
USPC ....................................... 180/274; 296/187.03
See application file for complete search history.

(56) References Cited

U.S. PATENT DOCUMENTS

| | | | | |
|---|---|---|---|---|
| 4,334,693 | A * | 6/1982 | Huber ..................... | 280/124.143 |
| 5,601,304 | A * | 2/1997 | Tilly et al. ................ | 280/124.15 |
| 5,607,177 | A * | 3/1997 | Kato ....................... | 280/124.134 |
| 6,311,996 | B1 * | 11/2001 | Kato et al. .............. | 280/124.134 |
| 6,705,627 | B2 * | 3/2004 | Hasebe et al. ......... | 280/124.134 |
| 6,892,621 | B2 * | 5/2005 | Grosch ................... | 89/1.11 |
| 7,900,964 | B2 * | 3/2011 | Chretien et al. ........ | 280/784 |
| 8,033,557 | B2 * | 10/2011 | Dundon .................. | 280/124.134 |
| 8,857,555 | B2 * | 10/2014 | Paintmayer et al. .......... | 180/274 |
| 2002/0180171 | A1 * | 12/2002 | Hasebe et al. ......... | 280/124.134 |
| 2003/0090099 | A1 * | 5/2003 | Miyasaka ............... | 280/784 |
| 2006/0151970 | A1 * | 7/2006 | Kaminski et al. ...... | 280/124.134 |
| 2013/0241166 | A1 * | 9/2013 | Paintmayer et al. ... | 280/124.125 |

* cited by examiner

*Primary Examiner* — Ruth Ilan
*Assistant Examiner* — Timothy Wilhelm
(74) *Attorney, Agent, or Firm* — Morgan, Lewis & Bockius LLP

(57) ABSTRACT

An automotive wheel separation mechanism may include a hitting member that hits and breaks a lateral arm connecting a wheel to a vehicle body by being pushed back in the longitudinal direction of a vehicle due to a shock force from the outside in a front collision, and an anti-sliding protrusion that is disposed on the lateral arm to prevent the hitting member hitting the lateral arm from sliding on the lateral arm.

11 Claims, 5 Drawing Sheets

AUTOMOTIVE WHEEL SEPARATION MECHANISM

CROSS-REFERENCE TO RELATED APPLICATION

The present application claims priority to Korean Patent Application No. 10-2013-0158323 filed Dec. 18, 2013, the entire contents of which is incorporated herein for all purposes by this reference.

BACKGROUND OF THE INVENTION

1 Field of the Invention

The present invention relates to an automotive wheel separation mechanism. More particularly, the present invention relates to an automotive wheel separation mechanism that induces separation of a wheel by hitting a lateral arm in a front collision.

2. Description of Related Art

In general, vehicles are equipped with various front collision compensating mechanisms to reduce damage to the vehicles and protect passengers when they are in motion and collide with another vehicle or object (hereafter, referred to as a hit-object) ahead.

As the front collision compensating mechanisms of the related art, there are a bumper beam elongated at the front in the width direction of a vehicle and a crash box disposed behind the bumper beam and absorbing and reducing shock energy transmitted through the bumper beam.

The bumper beam and the crash box are mounted and supported on a front side member elongated in the longitudinal direction of a vehicle and the front side member also absorbs and reduces shock energy transmitted though the bumper beam or the crash box by deforming rearward in the longitudinal direction of the vehicle.

However, when a vehicle that is in motion does not hit a hit-object with a head-on collision, but the outer side in the width direction of the vehicle hits a hit-object (hereafter, referred to as 'small overlap collision'), the front side member fails to show its shock absorption ability by bending inward or outward in the width direction of the vehicle without deforming in the its longitudinal direction and the hit-object hits the fender apron and the wheels, around the front side member.

When the hit-object hits a wheel, the wheel is pushed to the interior of the vehicle by the hit-object and threatens the safety of the passenger in the interior, such that there is a need of a mechanism that can prevent serious damage to a vehicle body due to a wheel and injury of passengers by inducing the wheel to be appropriately separated in a front collision or an overlap collision.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing an automotive wheel separation mechanism having advantages of preventing serious damage to a vehicle body due to a wheel and injury of passengers by inducing the wheel to be separated with early breakage of a lateral arm, by being pushed rearward by a hit-object and hitting the lateral arm supporting the wheel to a sub-frame, in a front collision or a front small overlap collision.

In an aspect of the present invention, an automotive wheel separation mechanism may include a hitting member that hits and breaks a lateral arm connecting a wheel to a vehicle body by being pushed back in the longitudinal direction of a vehicle due to a shock force from the outside in a front collision, and an anti-sliding protrusion that is disposed on the lateral arm to prevent the hitting member hitting the lateral arm from sliding on the lateral arm.

The hitting member may have an upper end fixed to a front end in the longitudinal direction of a vehicle of a front side member elongated in the longitudinal direction of the vehicle or fixed to the front end in the longitudinal direction of the vehicle of a front fender apron-upper member elongated forward in the longitudinal direction from upper portion in the height direction of the vehicle, and a rear end that is elongated rearward in the longitudinal direction of the vehicle and in which the lateral arm is fitted with a gap.

The hitting member may be formed in an L-shape by the upper end and the rear end thereof.

A groove in which the lateral arm is movably fitted may be formed at the rear end.

The groove may be formed in a U-shape.

The width of the groove may be larger than the outer diameter of the lateral arm.

The hitting member may be formed in the shape of a hollow pipe.

The anti-sliding protrusion may be disposed outside in the width direction of the vehicle further than the rear end of the hitting member.

The anti-sliding protrusion may protrude from the lateral arm further than the width of the groove.

A hole may be formed through the lateral arm and the anti-sliding protrusion may be inserted in the hole.

The hitting member may be formed by hydro forming.

According to the automotive wheel separation mechanism of an exemplary embodiment of the present invention, in a front collision or a front small overlap collision with a hit-object of a vehicle that is in motion, the hit-object comes inside to a wheel, in which the hitting member at the front end of the front side member or at the front end of the fender apron-upper member hits and breaks earlier the lateral arm supporting the wheel to the sub-frame while being pushed back by the hit-object.

As the lateral arm is broken earlier, the wheel is separated from the sub-frame included in the front vehicle body, to the outside in the width direction of the vehicle, such that the wheel does not damage the vehicle body by being pushed back by the hit-object and injury of passengers due to serious damage to the vehicle body by the wheel is prevented, and accordingly, the passengers can be kept more safe.

Further, when the hit-object keep moving to the rear of the vehicle, the hitting member stops the hit-object from moving to the rear and absorbs and reduces shock energy from the hit-object while being compressed on the vehicle body, such that it is possible to reduce damage to the vehicle and injury of passengers due to a collision.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
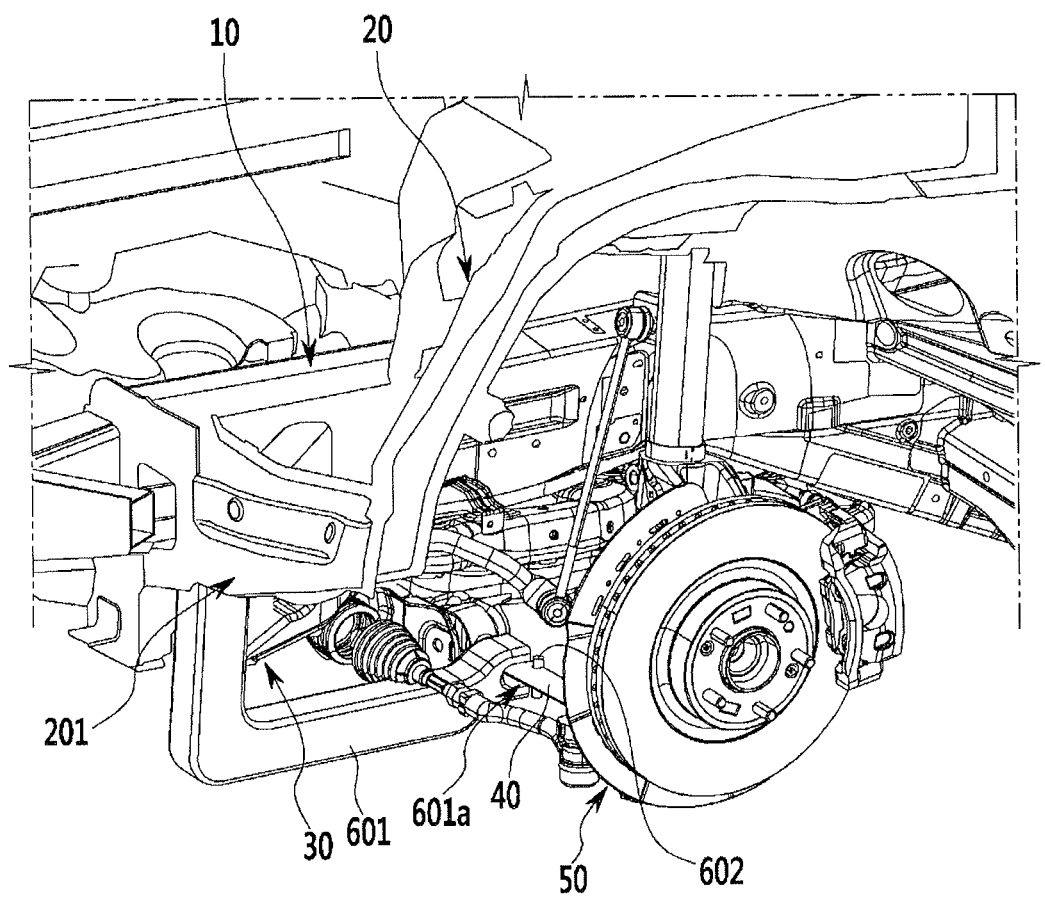
FIG. 1 is a perspective view showing an automotive wheel separation mechanism which is on the front end of a fender apron-upper member according to an exemplary embodiment of the present invention.
Figure 2:
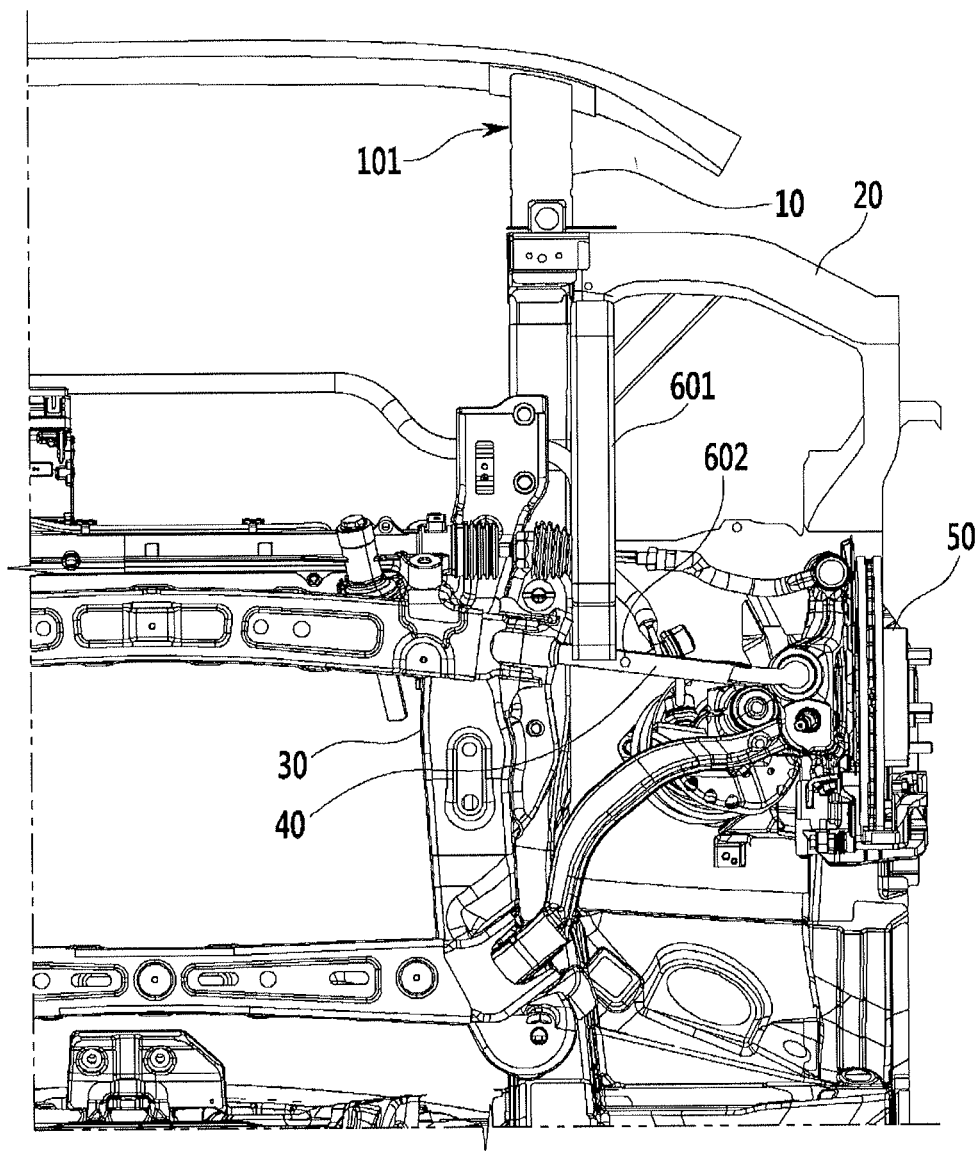
FIG. 2 is a top plan view of FIG. 1 according to an exemplary embodiment of the present invention.

Reference numerals set forth in the Drawings include reference to the following elements as further discussed below.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the Field of the Invention to which the present invention pertains may carry out the exemplary embodiment.

Referring to FIGS. 1 to 4, a front vehicle body of a vehicle may include a front side member 10 elongated in the longitudinal direction of the vehicle.

The front side member 10 may have a front end 101 that is formed in the longitudinal direction of a vehicle and on which a bumper beam etc. are mounted and supported.

A front fender apron-upper member 20 is disposed outside in the width direction of the vehicle.

The front fender apron-upper member 20 is elongated vertically in the height direction of the vehicle and forward in the longitudinal direction of the vehicle and may have a front end 201 coupled to the front end 101 of the front side member 10.

A sub-frame 30 where a suspension system is mounted and supported is disposed under the front side member 10 and the front fender apron-upper member 20.

The inner front end of a lateral arm 40 in the width direction of the vehicle is connected to the sub-frame 30 by a joint and the outer front end of the lateral arm 40 in the width direction of the vehicle is connected to a wheel 50, such that the wheel 50 is supported on the sub-frame 30 included in the front vehicle body through the lateral arm 40.

A pair of lateral arms 40 may be disposed in front and in rear in the longitudinal direction of the vehicle.

In an aspect of the present invention, the automotive wheel separation mechanism 60 may be disposed in the space between the lateral arm 40 and the front end 201 of the front fender apron-upper member 20.

The automotive wheel separation mechanism may include a substantially L-shaped hitting member 601 and an anti-sliding protrusion 602 at a longitudinally predetermined position on the lateral arm 40.

The hitting member 601 may be formed in the shape of a hollow rectangular pipe.

The upper end of the hitting member 601 in the height direction of the vehicle may be fixed to the bottom or a side of the front end 201 of the front fender apron-upper member 20.

The upper end of the hitting member 601 in the height direction of the vehicle may be fixed to the bottom or a side of the front end 101 of the front side member 10.

The rear end of the hitting member 601 in the longitudinal direction of the vehicle extends rearward to the lateral arm 40 in the longitudinal direction and may have a substantially U-shaped groove 601a in which the lateral arm 40 can be fitted.

The width of the U-shaped groove 601a is larger than the outer diameter of the lateral arm 40, enough to move up/down or front/back with the lateral arm 40 in the groove 601a.

The hitting member 601 may be formed by hydro forming.

The anti-sliding protrusion 602 is positioned outside in the width direction of the vehicle, further than the portion where the lateral arm 40 is fitted in the U-shaped groove 601a.

The anti-sliding protrusion 602 needs to have a protrusion length larger than the outer diameter of the lateral arm 40 and the width of the groove 601a.

The anti-sliding protrusion 602 prevents the rear end of the hitting member 601 with the lateral arm 40 fitted, from sliding outward in the width direction of the vehicle.

The anti-sliding protrusion 602 may be formed in a hole formed through the lateral arm 40.

Referring to FIGS. 3A-3E, in the automotive wheel separation mechanism according to an exemplary embodiment of the present invention, in a front small overlap collision with a hit-object 70 such as a barrier of a vehicle that is in motion, the hit-object can move inside a vehicle body from the outside in the width direction of the vehicle body, around the front side member 10, in which the hitting member 601 comes in contact with the hit-object 70 earlier than the wheel 50 or the hitting member 601 and the wheel 50 simultaneously come in contact with the hit-object 70, such that they are pushed back by the hit-object 70.

The hitting member 601 may be pushed back by the front side member 10 or the front fender apron-upper member 20 too.

Figure 3A:
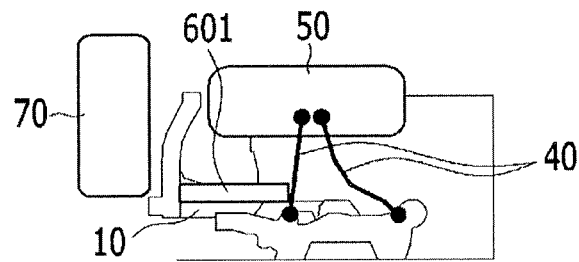
FIGS. 3A-3E are views illustrating separation of a wheel from a vehicle body in a front small overlap collision by the automotive wheel separation mechanism according to an exemplary embodiment of the present invention.
Figure 3B:
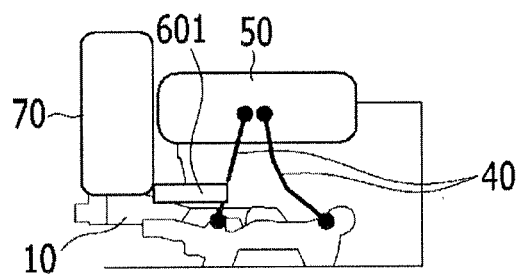
Figure 3C:
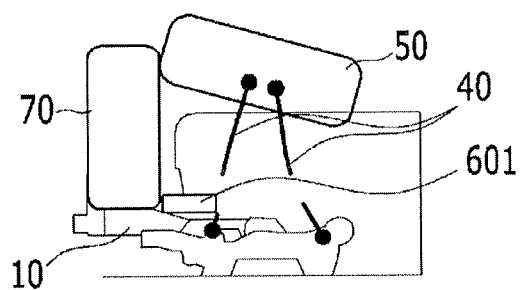

As the hitting member 601 is pushed back, the lateral arm 40 is fitted into the groove 601*a* and hit back, such that the lateral arm 40 is separated from the sub-frame 30. Accordingly, serious damage to the vehicle body and injury of passengers due to the wheel 50 are prevented as illustrated in FIG. 3C.

Figure 3D:
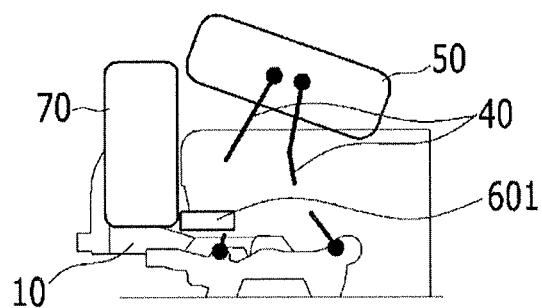
Figure 3E:
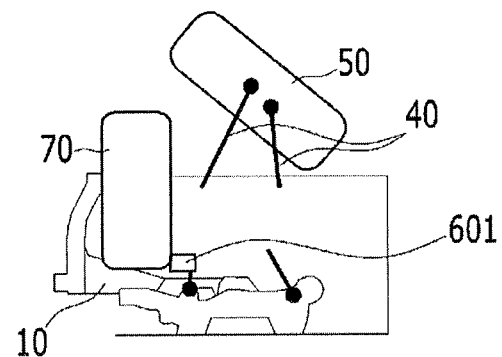
Figure 4:
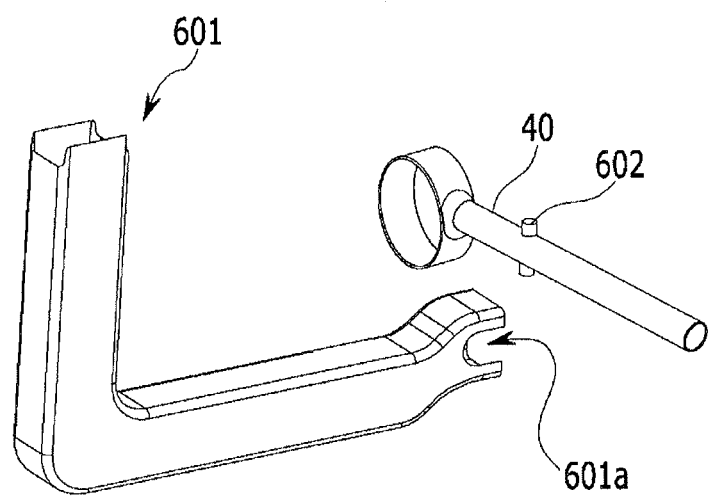
FIG. 4 is an exploded perspective view of the automotive wheel separation mechanism according to an exemplary embodiment of the present invention.

When the collision proceeds, the hitting member 601 stops the hit-object 70 moving inside the vehicle body and absorbs and reduces shock from the hit-object 70 while being compressed back by the hit-object 70 as illustrated in FIG. 3D, and the wheel 50 is fully separated from the vehicle body and separated from the vehicle as illustrated in FIG. 3E by the hit-object 70 that keeps moving inside the vehicle body.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automotive wheel separation apparatus comprising:
   a hitting member, that hits and breaks a lateral arm connecting a wheel to a vehicle body, by being pushed back in a longitudinal direction of a vehicle due to a shock force from the outside in a front collision; and
   an anti-sliding protrusion that is disposed on the lateral arm to prevent the hitting member hitting the lateral arm from sliding on the lateral arm, the hitting member being formed with a groove in which the lateral arm is movably fitted.

2. The apparatus of claim 1,
   wherein the hitting member has an upper end fixed to a front end, in the longitudinal direction of the vehicle, of a front side member of a vehicle body elongated in the longitudinal direction of the vehicle or fixed to the front end, in the longitudinal direction of the vehicle, of a front fender apron-upper member which is elongated forward in the longitudinal direction from an upper portion in the height direction of the vehicle, and
   wherein the hitting member has a rear end that is elongated rearward in the longitudinal direction of the vehicle and in which the lateral arm is fitted with the groove.

3. The apparatus of claim 2, wherein the anti-sliding protrusion is disposed outside in a width direction of the vehicle further than the rear end of the hitting member.

4. The apparatus of claim 2, wherein the hitting member is formed in an L-shape by the upper end and the rear end thereof.

5. The apparatus of claim 4, wherein the groove is formed at the rear end.

6. The apparatus of claim 5, wherein the anti-sliding protrusion protrudes from the lateral arm further than the width of the groove.

7. The apparatus of claim 5, wherein the groove is formed in a U-shape.

8. The apparatus of claim 7, wherein a width of the groove is larger than an outer diameter of the lateral arm.

9. The apparatus of claim 1, wherein the hitting member is formed in a shape of a hollow pipe.

10. The apparatus of claim 1, wherein a hole is formed through the lateral arm, and the anti-sliding protrusion is inserted in the hole.

11. The apparatus of claim 1, wherein the hitting member is formed by hydro forming.

\* \* \* \* \*